US011373555B2

(12) United States Patent
 Zhang et al.

(10) Patent No.: US 11,373,555 B2
(45) Date of Patent: Jun. 28, 2022

(54) TEACHING SYSTEM FOR REMOTE HYDRAULIC EXPERIMENTS BASED ON COMBINATION OF VIRTUAL AND REAL

(71) Applicant: Dalian University of Technology, Dalian (CN)

(72) Inventors: Hong Zhang, Dalian (CN); Xin Liu, Dalian (CN); Rui Yang, Dalian (CN); Dali Chai, Dalian (CN); Jianwei Liu, Dalian (CN); Wentao Zhang, Dalian (CN); Lan Ding, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 423 days.

(21) Appl. No.: 16/744,687

(22) Filed: Jan. 16, 2020

(65) Prior Publication Data

US 2020/0320902 A1    Oct. 8, 2020

(30) Foreign Application Priority Data

Apr. 3, 2019  (CN) .......................... 201910263758.7

(51) Int. Cl.
 *G09B 25/02*    (2006.01)
 *G06F 30/17*    (2020.01)
 (Continued)

(52) U.S. Cl.
 CPC .......... *G09B 25/025* (2013.01); *G06F 30/17* (2020.01); *G06F 30/20* (2020.01); *G09B 5/065* (2013.01)

(58) Field of Classification Search
 CPC ....... G09B 25/025; G09B 5/065; G06F 30/20; G06F 30/17
 See application file for complete search history.

(56) References Cited

U.S. PATENT DOCUMENTS

| 2004/0104935 A1* | 6/2004 | Williamson | ............ G06T 15/20 |
| | | | 715/757 |
| 2012/0005390 A1* | 1/2012 | Hoang | .................... H04L 67/38 |
| | | | 710/311 |

(Continued)

OTHER PUBLICATIONS

Cui Zhang, Xiaobin Wang, Design of the Control System for Hydraulic Experimental Bench based on LabVIEW, 2011, IEEE, 3 pages (Year: 2011).*

(Continued)

*Primary Examiner* — Justin S Lee
(74) *Attorney, Agent, or Firm* — Muncy, Geissler, Olds & Lowe, P.C.

(57) ABSTRACT

It is a teaching system for remote hydraulic experiments based on combination of virtual and real, belonging to the field of teaching application. In the virtual simulation teaching system for remote hydraulic experiments based on combination of virtual and real, the virtual and real combination part involves that a hydraulic circuit is simulated by a student by remotely calling the Automation Studio software on the experimental platform, the hydraulic circuit is modified and optimized according to the idea of the student, and the hydraulic experimental platform is connected finally to perform actual operations. The system is also added with a network HD ball machine, a network video recorder, a switch, a ball machine bracket, a router and other devices to form a feedback system, so the student can observe the real-time operation of the hydraulic experimental platform through the feedback system.

1 Claim, 2 Drawing Sheets

Connected through remote access software

Connected to electrical circuits via AS software

Upper computer of experimental plateform

Hydraulic experimental plateform

Receiving video by a configuration platform of a network HD ball machine

(51) Int. Cl.
*G06F 30/20* (2020.01)
*G09B 5/06* (2006.01)

(56) References Cited

U.S. PATENT DOCUMENTS

2014/0165281 A1* 6/2014 Khorsandraftar .... G08B 21/088
  4/495
2017/0255713 A1* 9/2017 Zhang .................... G06F 30/00

OTHER PUBLICATIONS

Nedim Hodžić, The Application of Software Automation Studio in Design and Work Simulation of Hydraulic Systems, Sep. 10-12, 2014, TMT, pp. 1-4 (Year: 2014).*

* cited by examiner

TEACHING SYSTEM FOR REMOTE HYDRAULIC EXPERIMENTS BASED ON COMBINATION OF VIRTUAL AND REAL

TECHNICAL FIELD

The present invention belongs to the field of teaching application, and relates to a teaching system for remote hydraulic experiments based on combination of virtual and real.

BACKGROUND

Experiment teaching is an important teaching link for science and engineering students, and is also an important way to cultivate students' practical ability and innovative thinking. Through the experiment link, a student can better master abstract theories, learn basic knowledge and skills, and develop the ability to analyze and solve problems. At present, the problem in experiment teaching is how to enable a student to remotely control laboratory equipment and complete corresponding experiments without being limited by time and location. Virtual simulation teaching is one of the means to solve the problem. Virtual simulation experiments based on combination of virtual and real not only assist teachers and schools in scientific research, but also have the advantages of high shareability, high security, high economy and friendly human-computer interaction interface in the teaching aspect. Automation Studio software is arranged at the computer terminal of a hydraulic experimental platform, so that the student may use this easy-to-use and powerful professional circuit simulation software in a mode of remote call. In this way, the student may use the software remotely at any time to perform the operations of simulation, practice and re-simulation. By means of such a complete set of processes, not only the remotely called experiment platform is controlled automatically and intelligently, but also the student is made to obtain better experimental experience and more optimized experimental results.

SUMMARY

By combining the construction requirements of a hydraulic virtual simulation laboratory, the present invention designs a virtual simulation teaching system for remote hydraulic experiments based on combination of virtual and real. In the virtual simulation teaching system, the virtual and real combination part involves that a hydraulic circuit is simulated by a student by remotely calling the Automation Studio software on the experimental platform, the hydraulic circuit is modified and optimized according to the idea of the student, and the hydraulic experimental platform is connected finally to perform actual operations. The system is also added with a network HD ball machine, a network video recorder (NVR), a switch, a ball machine bracket, a router and other devices to form a feedback system, so the student can observe the real-time operation of the hydraulic experimental platform through the feedback system.

To achieve the above purpose, the present invention adopts the following technical solution:

A teaching system for remote hydraulic experiments based on combination of virtual and real, comprising the following steps:

Step 1: controlling Teamviewer software to implement remote access, and additionally setting six essential trigger buttons:

the remote access means that a student client can remotely control the desktop of an upper computer of a hydraulic experimental platform. Teamviewer connection is an application that can be used for remote control in the background of any firewall or NAT proxy, enabling the client and the hydraulic experimental platform to implement desktop sharing, file transfer and other functions. The remote access software can acquire access to the upper computer of the hydraulic experimental platform of the laboratory by starting the Teamviewer remote connection.

The additionally set six trigger buttons respectively correspond to Start remote control, Request to open the hydraulic pump, Record video, Complete recording, Request to close the hydraulic pump, and Complete experiment. The Start remote control part means that when the remote access software initially operates, the part continuously updates the remote access software through the network; and when the Start remote control operates, the remote access software acquires information about the project definition of the position control experiment, the design drawing of the hydraulic circuit, the type and number of used hydraulic components, and the purpose and requirements from the experiment project library. The Request to open the hydraulic pump means that as a first exchange button of the remote access software, the part issues a start command to the laboratory experimenter through the sound equipment of the hydraulic experimental platform. The Record video means that as a supervision part established by the remote access software, the supervision part acquires compressed video by performing frame fetching on the screen of the client computer at regular time. The Complete recording means that as a termination control part of the record video button of the remote access software, the Complete recording stops the frame processing of the record video supervision part and terminates the operation of the Record video. The Request to close the hydraulic pump means that as a second exchange button of the remote access software, the part issues a termination command to the laboratory experimenter through the sound equipment of the hydraulic experimental platform. The Complete experiment means that as operation termination button of the remote access software, the part performs protocol termination on the Teamviewer remote connection.

Step 2: To achieve combination of virtual and real, building an electrical circuit to control the hydraulic experimental platform through Automation Studio software:

the built electrical circuit comprises a 24V power supply, a command value module, a controller module, a command value specification module, a command value/actual value display, a position sensor and a wiring board, wherein the command value module, the controller module, the command value specification module, the command value/actual value display and the wiring board are connected with the 24V power supply respectively; the command value module is connected with the controller module; the signal sending end of the position sensor is connected with the controller module, and a receiving device of the position sensor is installed on an operating platform of the hydraulic experimental platform; the command value/actual value display is connected with the controller module, and is mainly responsible for receiving the data of the controller module and displaying same graphically and digitally; the input end of the wiring board is connected with the command value specification module and the controller module respectively by contact switches, and the output end thereof is connected with hydraulic components on the hydraulic experimental platform, playing a role of transferring signals;

the Automation Studio is installed at the upper computer terminal of the hydraulic experimental platform to transfer commands, and is capable of achieving dynamic simulation of electro-hydraulic control and co-simulation of other software; the student may perform virtually simulated hydraulic circuit connection and electrical circuit connection according to the hydraulic circuit diagram and electrical circuit diagram of this project. On the premise of not modifying the functions of various hydraulic circuits in the experiment, the student may use the Automation Studio to modify the position of each hydraulic circuit component and the layout of the tubing connections according to his/her idea. In a similar way, when building the virtual electrical circuit, the student may use the Automation Studio to modify electrical parameters such as amplification coefficient and the like according to his/her idea.

For the virtual and real combination part, the experimenter fixes the position of each hydraulic component on the hydraulic experimental platform according to the hydraulic circuit diagram of the experiment project, and connects various hydraulic components using tubing to form an actual hydraulic circuit; and in a similar way, for the electrical circuit, the experimenter needs to build an actual electrical circuit on the hydraulic experimental platform according to the electrical circuit diagram of the experiment project; by remotely accessing the Automation Studio software at the upper computer terminal of the hydraulic experimental platform, the student performs virtually simulated hydraulic circuit connection and electrical circuit connection according to the hydraulic circuit diagram and electrical circuit diagram of the specific project; in the process of operating the Automation Studio software, on the premise of not modifying the functions of various hydraulic circuits in the experiment, the student may modify the position of each hydraulic circuit component and the layout of the tubing connections according to his/her idea, and in a similar way, the student can modify electrical parameters such as amplification coefficient and the like according to his/her idea; and finally, the virtual simulation circuit is connected with the actual circuit to verify whether the virtually simulated hydraulic circuit of the student is correct.

The actual hydraulic circuit and the actual electrical circuit are circuits formed for different hydraulic experiment items. Hydraulic experiment items correspond to two circuits of hydraulic circuit and electrical circuit.

Step 3: Establishing a closed-loop feedback system, and establishing contact between the student and the hydraulic experimental platform:

the hardware part of the feedback system comprises a hydraulic experimental platform, a network HD ball machine, a network video recorder, a switch, a router and a client computer.

3.1) Installing the network HD ball machine, and setting preset points for the network HD ball machine:

the network HD ball machine is connected with a camera and is installed on the ball machine bracket, and is oriented to the upper half of the hydraulic experimental platform to acquire the layout and operation information about the hydraulic experimental platform; the network video recorder is interconnected with the network HD ball machine and the switch respectively by interfaces, and the acquired information about the hydraulic experimental platform is uploaded to the upper computer of the hydraulic experimental platform by the system through the switch.

The configuration platform controlling the network HD ball machine is installed at the upper computer terminal of the hydraulic experimental platform after hardware is installed, and preset points of experiment components are set in the channel management of the main menu of the configuration platform.

3.2) Configuring a network for equipment at the laboratory terminal:

the router is installed near the wired network interface of the laboratory. The hydraulic experimental platform is mainly used for teaching training of hydraulic technology, is capable of performing modular structural design and quick disassembly and connection of components, and is connected with the upper computer to receive the network and install Automation Studio software for controlling hardware equipment. The upper computer terminal can obtain a wireless network; the client computer is connected with the network video recorder of the hydraulic laboratory by the network; the network video recorder is connected with the preset points set by the computer to control the network HD ball machine, so as to establish a closed-loop feedback system to feedback adjustment functions.

3.3) Mobilizing hardware of the feedback system using the Teamviewer software and the configuration platform of the network HD ball machine:

the client accesses the upper computer of the hydraulic experimental platform connected to the router through the Teamviewer software, and the configuration platform of the network HD ball machine at the upper compute terminal is started. According to the connection modes in steps 3.1 and 3.2, after the configuration platform is started, the network HD ball machine starts to acquire real-time data of the hydraulic experimental platform, and the network video recorder collects data through the network HD ball machine and then encodes same to generate images. The switch uploads the images generated by the network video recorder to the upper computer of the hydraulic experimental platform. The client views real-time images on the configuration platform of the network HD ball machine through the Teamviewer software.

After the feedback system is established, the student can acquire the image of the hydraulic experimental platform of the laboratory through the system and control the network HD ball machine through the preset points.

The present invention has the advantageous effects that: the virtual simulation teaching system for remote hydraulic experiments based on combination of virtual and real adds opportunities for the student to come into visually close contact with the experimental platform while breaking through time and location limitation; since the .NET-based remote access software uses the mode of encapsulating Teamviewer remote software, reduces the time delay of client video and real-time operation of the hydraulic experimental platform of the laboratory in the case of guaranteeing the fluency of control effects; and implements the control connection between the Automation Studio software and the engineering-level hydraulic experimental platform using the electrical circuit design, and acquires real experimental representation and experimental data. This method allows the student to easily implement the core components of task configuration and programming through the Automation Studio software. The graphical hardware and software configuration can clearly outline the whole project, process variables and data are symbolically addressed here, and the system may automatically identify and support target hardware.

DETAILED DESCRIPTION

Figure 1:
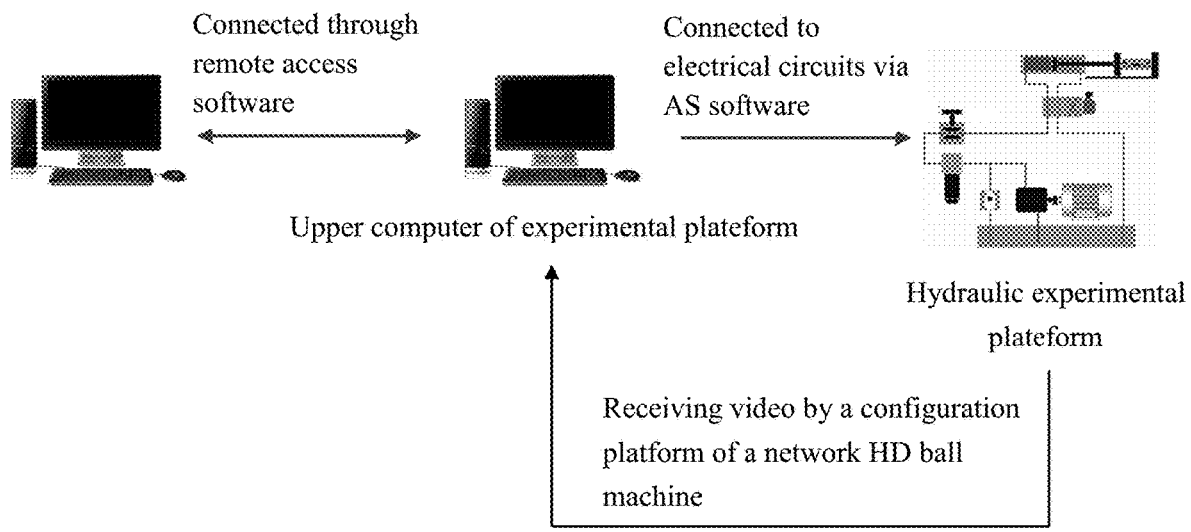
FIG. 1 is a block diagram of a feedback system of a teaching system of the present invention.
Figure 2:
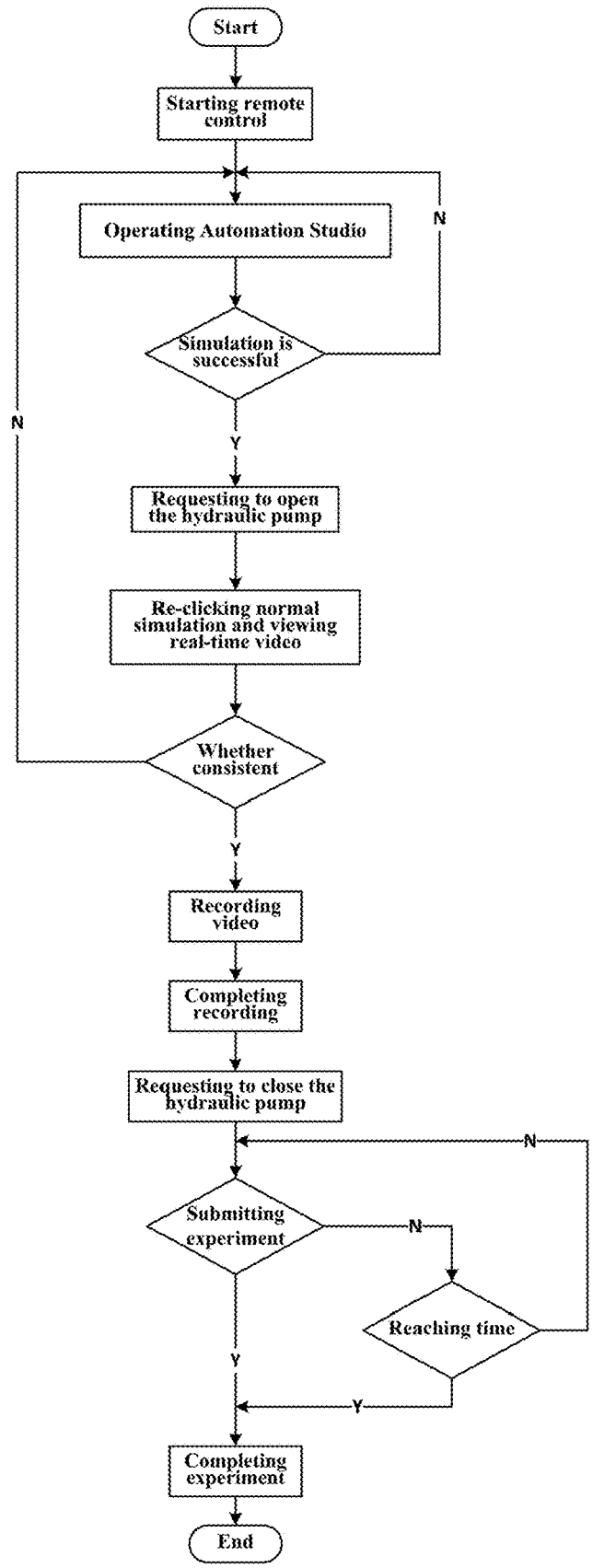
FIG. 2 is a flow chart of a remote operation of a teaching system of the present invention.

The technical solution in embodiments of the present invention will be clearly and fully described below. Apparently, the described examples are merely part of the cases of the present invention, not all of the cases.

Step 1: controlling Teamviewer software to implement remote access, and additionally setting six essential trigger buttons:

1.1) controlling Teamviewer software to implement remote access:

first, using functions in the VS2012 software, to enable the client to acquire the local Teamviewer ID and transmit same to the server; then, writing codes and seeking the Teamviewer ID in the registry; and finally, acquiring, by the server, the Teamviewer ID transmitted by the client, thus achieving remote control;

1.2) implementing starting remote control, requesting to open the hydraulic pump and requesting to close the hydraulic pump:

starting remote control: as the first step of the whole remote access, defining a trigger button named after "start remote control", the trigger event being a function of the controlled Teamviewer software;

requesting to open the hydraulic pump: defining a trigger button named "the request to open the hydraulic pump" and setting Y as a response field; setting polling database status every 7 seconds in the program, and examining whether a corresponding trigger field is Y, the trigger event being a voice about request to open the hydraulic pump broadcast by the hydraulic experimental platform of the laboratory; and requesting to close the hydraulic pump: defining a trigger button named "the request to close the hydraulic pump" and setting Y as a response field; setting polling database status every 7 seconds in the program, and examining whether a corresponding trigger field is Y, the trigger event being a voice about request to close the hydraulic pump broadcast by the hydraulic experimental platform of the laboratory.

1.3) Implementing recording video, completing recording and completing experiment:

recording video: defining a trigger button named after the record video and setting Y as a response field; setting polling database status every 7 seconds in the program, and examining whether the trigger field of the record video is Y, and if the trigger event is a function for controlling the record video, starting recording;

completing recording: defining a trigger button named after the complete recording and setting Y as a response field; setting polling database status every 7 seconds in the program, and examining whether the trigger field of the complete recording is Y; and if the trigger event is a function for controlling the complete recording, stopping recording; and completing experiment: as the last step of the whole remote access, defining a trigger button named after the complete experiment, the trigger event being a function for terminating the controlled Teamviewer software.

Step 2: To achieve combination of virtual and real, building an electrical circuit to control the hydraulic experimental platform through Automation Studio software:

the built electrical circuit comprises a 24V power supply, a command value module, a controller module, a command value specification module, a command value/actual value display, a position sensor and a wiring board, wherein the command value module, the controller module, the command value specification module, the command value/actual value display and the wiring board are connected with the 24V power supply respectively;

the present invention relates to multiple experiment items frequently used in hydraulic teaching, including position control experiment, hydraulic cylinder slow-in and fast-out experiment, throttling speed control circuit experiment, volume speed control circuit experiment, volume throttling speed control circuit experiment, and pressure circuit experiment, etc.; the operation steps and implementation methods of the virtual simulation construction of remote hydraulic experiments of various experiment items are not changed, while only the number and types of hydraulic components of the experiment items are different, so that the invention design in the second step is described in detail using the position control experiment as an example. The hydraulic components used in the position control experiment mainly include a proportional valve, a hydraulic cylinder, a load hydraulic cylinder, a pressure gauge, a two-position four-way reversing valve, and pressure reducing valve.

2.1) Inputting an operating command in the position control experiment into the command value module and storing same:

an operating command signal in the position control experiment is input into the command value module in the mode of PLC program by an upper computer and is stored; the command value module is connected with the controller module, and the input end of the wiring board is connected with the controller module by a contact switch, so that the controller may acquire the operating command in the position control experiment from the command value module by default.

2.2) Connecting the position sensor to the hydraulic cylinder and the controller module:

the signal sending end of the position sensor is connected with the controller module, and a signal receiving device of the position sensor is installed at the end of the piston rod of the hydraulic cylinder; the position sensor is a pull rod-type linear displacement sensor which converts the displacement of the piston rod of the hydraulic cylinder into an electrical signal and transmits the electrical signal to the controller module for processing.

2.3) Transmitting a calibration value in the position control experiment into the command value specification module:

the command value specification module is connected with the wiring board, and then the wiring board is connected with the controller module; and voltages across the command value specification module are regulated, and the voltages are input in the order from small to large for calibration. It should be explained in detail that both the connection between the command value specification module and the wiring board and the connection between the wiring board and the controller module are achieved through a contact switch.

2.4) Connecting other auxiliary electrical modules:

the command value/actual value display is connected with the controller module, and is mainly responsible for receiving the data of the controller module and displaying same graphically and digitally; and various electrical modules are connected to the interface of the 24V power supply.

2.5) Configuring environment of the upper computer of the hydraulic experimental platform, to enable the Automation Studio software to be butted with the USB interface of the upper computer of the hydraulic experimental platform:

the Automation Studio, which is installed at the upper computer terminal of the hydraulic experimental platform, is a hydraulic system simulation software developed by the Famic Technologies, has the main characteristic of fast and efficient design, is integrated with electrical control, automation system and mechanical system simulation, and is capable of achieving dynamic simulation of electro-hydraulic control and co-simulation of other software. The environment of the upper computer of the hydraulic experimental platform is configured, and the Automation Studio hardware drive, as an administrator, is installed at the upper computer terminal of the hydraulic experimental platform, to enable the Automation Studio software to be connected with the USB interface of the upper computer by a signal to transfer commands; and the USB interface is connected with the command value module by a conversion interface data line, to enable the Automation Studio software to indirectly control the hydraulic experimental platform through the electrical circuit.

Step 3: Establishing a closed-loop feedback system, and establishing contact between student and the hydraulic experimental platform:

wherein the hardware part of the feedback system comprises a hydraulic experimental platform, a network HD ball machine, a network video recorder, a switch, a ball machine bracket, a router, a camera power supply and a client computer, wherein the hydraulic experimental platform is mainly used for teaching training of hydraulic technology, and has the main characteristic of being capable of performing modular structural design and quick disassembly and connection of components.

3.1) Installing the network HD ball machine, and setting preset points for the network HD ball machine:

the network HD ball machine is connected with the independent camera power supply and is installed on the ball machine bracket, and is oriented to the upper half of the hydraulic experimental platform to acquire the layout and operation information of the hydraulic experimental platform; and the network video recorder is interconnected with the switch and the network HD ball machine by interfaces;

the configuration platform controlling the network HD ball machine is installed at the upper computer terminal of the hydraulic experimental platform after hardware is installed; and preset points are set in the Channel Management of the main menu of the configuration platform, and at least one preset point is set for each pressure gauge, measuring cylinder and hydraulic cylinder displacement scale.

3.2) Configuring a network for equipment at laboratory terminal:

the router is installed near the wired network interface of the laboratory; there are three hydraulic experimental platforms in total, and each experimental platform is equipped with an upper computer to receive network and install Automation Studio software for controlling hardware equipment; the upper computer terminal is provided with a wireless network receiving port to obtain the wireless network;

the client accesses the upper computer of the hydraulic experimental platform connected to the router through the Teamviewer software, and the configuration platform of the network HD ball machine at the upper computer terminal is started; after the configuration platform is started, the network HD ball machine starts to acquire real-time data of the hydraulic experimental platform, and the network video recorder collects data through the network HD ball machine and then encodes to generate images; the switch uploads the images generated by the network video recorder to the upper computer of the hydraulic experimental platform; and the client views real-time images on the configuration platform of the network HD ball machine through the Teamviewer software.

So far, the feedback system is already established. The student can acquire the video of the hydraulic experimental platform of the laboratory through the system and control the network HD ball machine through the preset points.

Moreover, the teaching system for remote hydraulic experiments based on combination of virtual and real of the present invention includes an information transfer mode taking a mobile terminal as a carrier, achieves the connection between the laboratory equipment and the mobile terminal, and facilitates participants in appointing experiments at any time and any place. In the virtual simulation teaching system, the virtual and real combination part involves that a hydraulic circuit is simulated by a student by remotely calling the Automation Studio software on the experimental platform, the hydraulic circuit is modified and optimized according to the idea of the student, and the DS4 experimental platform is connected finally to perform actual operations. The system is also added with a network HD ball machine, a network video recorder, a switch, a ball machine bracket, a router and other devices to form a feedback system, so the student can observe the real-time operation of the DS4 experimental platform through the feedback system.

As mentioned above, although the present invention is explained based on the examples and drawings defined in the hydraulic virtual laboratory case, those skilled in the art can make various modifications, adjustments, and replacements or deformations from the above description. Appropriate effects can also be achieved if it is performed in a different order from the method described in the technology of the present invention, integrated or combined according to a different form from the method described by the described system, structure, device, circuit and other components, or replaced or substituted according to other components or equivalents. For the invention, all substitutions or replacements should be considered to belong to the protection scope of the invention without departing from the conception of the invention.

The invention claimed is:

1. A teaching system for remote hydraulic experiments based on combination of virtual and real, comprising the following steps:

Step 1: controlling remote access software to implement remote access, and additionally setting six trigger buttons, wherein:

the remote access means that a student client can remotely control a desktop of an upper computer of a hydraulic experimental platform, and the remote access software can acquire access to the upper computer of the hydraulic experimental platform of a laboratory by starting the remote connection;

the additionally set six trigger buttons respectively correspond to Start remote control, Request to open a hydraulic pump, Record video, Complete recording, Request to close a hydraulic pump, and Complete experiment;

the Start remote control means that when the remote access software initially operates, the Start remote control continuously updates the remote access software through a network; and when the Start remote control operates, the remote access software acquires information from an experiment project library; the Request to open the hydraulic pump means that as a first exchange button of the remote access software, the Request to open the hydraulic pump issues a start command to a laboratory experimenter through a sound equipment of the hydraulic experimental platform; the Record video means that as a supervision part established by the remote access software, the supervision part acquires video by performing frame fetching on a screen of the student client computer at regular time; the Complete recording means that as a termination control part of the Record video button of the remote access software, the Complete recording stops the frame processing of a record video supervision part and terminates the operation of the Record video; the Request to close the hydraulic pump means that as a second exchange button of the remote access software, the Request to close the hydraulic pump issues a termination command to the laboratory experimenter through the sound equipment of the hydraulic experimental platform; and the Complete experiment means that as operation termination software of the remote access software, the Complete experiment component performs protocol termination on the remote connection;

Step 2: to achieve combination of virtual and real, building an electrical circuit to control the hydraulic experimental platform through automation software, wherein:

building the electrical circuit comprises a 24-voltage power supply, a command value module, a controller module, a command value specification module, a command value or actual value display, a position sensor and a wiring board which are connected therewith, wherein the command value module is connected with the controller module; a signal sending end of the position sensor is connected with the controller module, and a receiving device thereof is installed on an operating platform of the hydraulic experimental platform; the command value or actual value display is connected with the controller module, and is responsible for receiving a data of the controller module and displaying the data graphically and digitally; an input end of the wiring board is connected with the command value specification module and the controller module respectively through contact switches, and an output end of the wiring board is connected with hydraulic components on the hydraulic experimental platform, playing a role of transferring signals;

the automation software is installed at the upper computer terminal of the hydraulic experimental platform to transfer commands, and is capable of achieving dynamic simulation of electro-hydraulic control and co-simulation of other software;

the laboratory experimenter fixes position of each hydraulic component on the hydraulic experimental platform according to a hydraulic circuit diagram of the experiment project library, and connects various hydraulic components using tubing to form an actual hydraulic circuit; and, for the electrical circuit, the laboratory experimenter builds an actual electrical circuit on the hydraulic experimental platform according to the electrical circuit diagram of the experiment project; by remotely accessing the automation software at the upper computer terminal of the hydraulic experimental platform, the student performs virtually simulated hydraulic circuit connection and electrical circuit connection according to the hydraulic circuit diagram and the electrical circuit diagram of the experiment project; in the process of operating the automation software, on premise of not modifying functions of various hydraulic circuits in the experiment, allowing the student to modify the position of each hydraulic circuit component and a layout of tubing connections, and further allowing the student to modify electrical parameters such as amplification coefficient; the virtual simulation circuit is connected with the actual electrical circuit to verify whether the virtually simulated hydraulic circuit of the student is correct;

Step 3: establishing a closed-loop feedback system, and establishing contact between the student and the hydraulic experimental platform, wherein:

a hardware part of the feedback system comprises the hydraulic experimental platform, a network high definition (HD) ball machine, a network video recorder, a switch, a router and a client computer;

3.1) installing the network HD ball machine, and setting preset points for the network HD ball machine, wherein the network HD ball machine is connected with a camera and is installed on a ball machine bracket, and is oriented to the upper half of the hydraulic experimental platform to acquire layout and operation information about the hydraulic experimental platform; the network video recorder is interconnected with the network HD ball machine and the switch respectively by interfaces, and the acquired information about the hydraulic experimental platform is uploaded to the upper computer of the hydraulic experimental platform by the system through the switch;

a configuration platform controlling the network HD ball machine is installed at the upper computer terminal of the hydraulic experimental platform after hardware is installed; and the preset points of experiment components are set in Channel Management of main menu of the configuration platform;

3.2) configuring a network for equipment at the laboratory terminal, wherein:

the hydraulic experimental platform, which is mainly used for teaching training of hydraulic technology, is capable of performing modular structural design and quick disassembly and connection of components, and is connected with the upper computer to receive the network and install automation software for controlling hardware equipment; the upper computer terminal can obtain a wireless network; the student client computer is connected with the network video recorder of the hydraulic laboratory by the network; the network video recorder is connected with the preset points set by the computer to control the network HD ball machine, so as to establish a closed-loop feedback system to feedback adjustment functions;

3.3) mobilizing hardware of the feedback system using the remote access software and the configuration platform of the network HD ball machine: the client accesses the upper computer of the hydraulic experimental platform connected to the router through the remote access software, and the configuration platform of the network HD ball machine at the upper compute terminal is started; according to connection modes in steps 3.1) and 3.2), after the configuration platform is started, the network HD ball machine starts to acquire real-time data of the hydraulic experimental platform, and the network video recorder collects data through the network HD ball machine and then encodes same to generate images; the switch uploads the images generated by the network video recorder to the upper computer of the hydraulic experimental platform; and the student client computer views real-time images on the configuration platform of the network HD ball machine through the remote access software.

\* \* \* \* \*